US007910662B2

(12) United States Patent
Chung et al.

(10) Patent No.: US 7,910,662 B2
(45) Date of Patent: Mar. 22, 2011

(54) HALOGENATION PROCESSES

(75) Inventors: David Yen-Lung Chung, Bellaire, TX (US); Michael Francis McDonald, Kingwood, TX (US); Robert Norman Webb, Kingwood, TX (US); Richard Dwight Hembree, Zachary, LA (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 214 days.

(21) Appl. No.: 12/095,103

(22) PCT Filed: Dec. 28, 2005

(86) PCT No.: PCT/US2005/047093
§ 371 (c)(1),
(2), (4) Date: May 27, 2008

(87) PCT Pub. No.: WO2007/075164
PCT Pub. Date: Jul. 5, 2007

(65) Prior Publication Data
US 2008/0293892 A1    Nov. 27, 2008

(51) Int. Cl.
*C08F 8/22* (2006.01)
*C08C 19/14* (2006.01)
(52) U.S. Cl. ............. 525/332.3; 525/53; 525/333.1; 525/333.4; 525/334.1; 525/355; 525/356
(58) Field of Classification Search .......... 525/53, 525/332.3, 333.1, 333.4, 334.1, 355, 356
See application file for complete search history.

(56) References Cited

U.S. PATENT DOCUMENTS

| | | | |
|---|---|---|---|
| 2,534,698 | A | 12/1950 | Calfee et al. |
| 2,548,415 | A | 4/1951 | Welch et al. |
| 2,644,809 | A | 7/1953 | Saylor |
| 3,023,191 | A | 2/1962 | Tegge et al. |
| 5,417,930 | A | 5/1995 | McDonald, Jr. et al. |
| 5,883,198 | A | 3/1999 | Kaszas et al. |
| 6,204,338 | B1 | 3/2001 | Kaszas et al. |
| 6,262,409 | B1 | 7/2001 | Avaro et al. |
| 2005/0101751 | A1 | 5/2005 | Shaffer et al. |
| 2005/0107536 | A1 | 5/2005 | Shaffer et al. |
| 2007/0128705 | A1* | 6/2007 | Saul et al. ........... 435/135 |

FOREIGN PATENT DOCUMENTS

| | | |
|---|---|---|
| EP | 0 803 517 | 10/1997 |
| EP | 0 803 518 | 10/1997 |
| EP | 803 517 B1 * | 9/2001 |
| WO | WO 2004/058825 | 7/2004 |
| WO | WO 2004/058827 * | 7/2004 |
| WO | WO 2004/058828 | 7/2004 |
| WO | WO 2004/058836 | 7/2004 |

OTHER PUBLICATIONS

Thaler, W.A., Buckley, Sr., D.J., *High Molecular-Weight, High Unsaturation Copolymers of Isobutylene and Conjugated Dienes*, 49 (4) Rubber Chemical Technology, 960 (1976).

* cited by examiner

*Primary Examiner* — Roberto Rabago
(74) *Attorney, Agent, or Firm* — Nancy T. Krawczyk; Leandro Arechederra

(57) ABSTRACT

The invention discloses improved processes to halogenate polymers. In particular, the invention discloses to improved processes to halogenate polymers made from $C_4$-$10_{12}$ isoolefins.

23 Claims, No Drawings

HALOGENATION PROCESSES

CROSS REFERENCE TO RELATED APPLICATIONS

The present application claims the benefit of PCT Application No. PCT/US2005/047,093 filed on 28 Dec. 2005, the disclosure of which is incorporated by reference.

FIELD OF INVENTION

The invention relates to improved processes to halogenate polymers. In particular, the invention relates to improved processes to halogenate polymers made from $C_4$-$10_{12}$ isoolefins.

BACKGROUND

Isoolefin polymers are prepared in carbocationic polymerization processes. The carbocationic polymerization of isobutylene and its copolymerization with comonomers like isoprene is mechanistically complex. The catalyst system is typically composed of two components: an initiator and a Lewis acid. Examples of Lewis acids include $AlCl_3$ and $BF_3$. Examples of initiators include Brönsted acids such as HCl, RCOOH (wherein R is an alkyl group), and $H_2O$. During the polymerization process, in what is generally referred to as the initiation step, isobutylene reacts with the Lewis acid/initiator pair to produce a carbenium ion. Following, additional monomer units add to the formed carbenium ion in what is generally called the propagation step. These steps typically take place in a diluent or solvent. Temperature, diluent polarity, and counterions affect the chemistry of propagation. Of these, the diluent is typically considered important.

Industry has generally accepted widespread use of a slurry polymerization process (to produce butyl rubber, polyisobutylene, etc.) in the diluent methyl chloride. Typically, the polymerization process extensively uses methyl chloride at low temperatures, generally lower than −90° C., as the diluent for the reaction mixture. Methyl chloride is employed for a variety of reasons, including that it dissolves the monomers and aluminum chloride catalyst but not the polymer product. Methyl chloride also has suitable freezing and boiling points to permit, respectively, low temperature polymerization and effective separation from the polymer and unreacted monomers. The slurry polymerization process in methyl chloride offers a number of additional advantages in that a polymer concentration of approximately 26% to 37% by volume in the reaction mixture can be achieved, as opposed to the concentration of only about 8% to 12% in solution polymerization. An acceptable relatively low viscosity of the polymerization mass is obtained enabling the heat of polymerization to be removed more effectively by surface heat exchange. Slurry polymerization processes in methyl chloride are used in the production of high molecular weight polyisobutylene and isobutylene-isoprene butyl rubber polymers. Likewise polymerizations of isobutylene and para-methylstyrene are also conducted using methyl chloride. Similarly, star-branched butyl rubber is also produced using methyl chloride.

However, there are a number of problems associated with the polymerization in methyl chloride, for example, the tendency of the polymer particles in the reactor to agglomerate with each other and to collect on the reactor wall, heat transfer surfaces, impeller(s), and the agitator(s)/pump(s). The rate of agglomeration increases rapidly as reaction temperature rises. Agglomerated particles tend to adhere to and grow and plate-out on all surfaces they contact, such as reactor discharge lines, as well as any heat transfer equipment being used to remove the exothermic heat of polymerization, which is critical since low temperature reaction conditions must be maintained.

The commercial reactors typically used to make these rubbers are well mixed vessels of greater than 10 to 30 liters in volume with a high circulation rate provided by a pump impeller. The polymerization and the pump both generate heat and, in order to keep the slurry cold, the reaction system needs to have the ability to remove the heat. An example of such a continuous flow stirred tank reactor ("CFSTR") is found in U.S. Pat. No. 5,417,930, incorporated by reference, hereinafter referred to in general as a "reactor" or "butyl reactor". In these reactors, slurry is circulated through tubes of a heat exchanger by a pump, while boiling ethylene on the shell side provides cooling, the slurry temperature being determined by the boiling ethylene temperature, the required heat flux and the overall resistance to heat transfer. On the slurry side, the heat exchanger surfaces progressively accumulate polymer, inhibiting heat transfer, which would tend to cause the slurry temperature to rise. This often limits the practical slurry concentration that can be used in most reactors from 26 to 37 volume % relative to the total volume of the slurry, diluent, and unreacted monomers. The subject of polymer accumulation has been addressed in several patents (such as U.S. Pat. No. 2,534,698, U.S. Pat. No. 2,548,415, U.S. Pat. No. 2,644,809). However, these patents have unsatisfactorily addressed the myriad of problems associated with polymer particle agglomeration for implementing a desired commercial process.

U.S. Pat. No. 2,534,698 discloses, inter alia, a polymerization process comprising the steps in combination of dispersing a mixture of isobutylene and a polyolefin having 4 to 14 carbon atoms per molecule, into a body of a fluorine substituted aliphatic hydrocarbon containing material without substantial solution therein, in the proportion of from one-half part to 10 parts of fluorine substituted aliphatic hydrocarbon having from one to five carbon atoms per molecule which is liquid at the polymerization temperature and polymerizing the dispersed mixture of isobutylene and polyolefin having four to fourteen carbon atoms per molecule at temperatures between −20° C. and −164° C. by the application thereto a Friedel-Crafts catalyst. However, '698 teaches that the suitable fluorocarbons would result in a biphasic system with the monomer, comonomer and catalyst being substantially insoluble in the fluorocarbon making their use difficult and unsatisfactory.

U.S. Pat. No. 2,548,415 discloses, inter alia, a continuous polymerization process for the preparation of a copolymer, the steps comprising continuously delivering to a polymerization reactors a stream consisting of a major proportion of isobutylene and a minor proportion isoprene; diluting the mixture with from ½ volume to 10 volumes of ethylidene difluoride; copolymerizing the mixture of isobutylene isoprene by the continuous addition to the reaction mixture of a liquid stream of previously prepared polymerization catalyst consisting of boron trifluoride in solution in ethylidene difluoride, maintaining the temperature between −40° C. and −103° C. throughout the entire copolymerization reaction . . . '415 teaches the use of boron trifluoride and its complexes as the Lewis acid catalyst and 1,1-difluoroethane as a preferred combination. This combination provides a system in which the catalyst, monomer and comonomer are all soluble and yet still affords a high degree of polymer insolubility to capture the benefits of reduced reactor fouling. However, boron trifluoride is not a preferred commercial catalyst for butyl polymers for a variety of reasons.

U.S. Pat. No. 2,644,809 teaches, inter alia, a polymerization process comprising the steps in combination of mixing together a major proportion of a monoolefin having 4 to 8, inclusive, carbon atoms per molecule, with a minor proportion of a multiolefin having from 4 to 14, inclusive, carbon atoms per molecule, and polymerizing the resulting mixture with a dissolved Friedel-Crafts catalyst, in the presence of from 1 to 10 volumes (computed upon the mixed olefins) of a liquid selected from the group consisting of dichlorodifluoromethane, dichloromethane, trichloromonofluormethane, dichloromonofluormethane, dichlorotetrafluorethane, and mixtures thereof, the monoolefin and multiolefin being dissolved in said liquid, and carrying out the polymerization at a temperature between −20° C. and the freezing point of the liquid. '809 discloses the utility of chlorofluorocarbons at maintaining ideal slurry characteristics and minimizing reactor fouling, but teaches the incorporation of diolefin (i.e. isoprene) by the addition of chlorofluorocarbons (CFC). CFC's are known to be ozone-depleting chemicals. Governmental regulations, however, tightly controls the manufacture and distribution of CFC's making these materials unattractive for commercial operation.

Additionally, Thaler, W. A., Buckley, Sr., D. J., *High Molecular-Weight, High Unsaturation Copolymers of Isobutylene and Conjugated Dienes,* 49(4) Rubber Chemical Technology, 960 (1976), discloses, inter alia, the cationic slurry polymerization of copolymers of isobutylene with isoprene (butyl rubber) and with cyclopentadiene in heptane.

Therefore, finding alternative diluents or blends of diluents to create new polymerization systems that would reduce particle agglomeration and/or reduce the amount of chlorinated hydrocarbons such as methyl chloride is desirable.

Hydrofluorocarbons (HFCs) are of interest and the use of HFCs in polymerization processes has been disclosed in, for example, WO 2004/058828 and WO 2004/058827. However, the use of HFCs in polymerization processes would require finding new post-polymerization or "downstream" processes that would accommodate for such new technology.

Among such post-polymerization or "downstream" processes are processes for halogenation of the polymer. For example, U.S. Pat. No. 5,883,198 discloses, inter alia, an improved process for the bromination of a $C_4$-$C_6$ isoolefin-$C_4$-$C_6$ conjugated diolefin polymer which comprises preparing a solution of said polymer in a solvent, adding to said solution bromine and reacting said bromine with said polymer at a temperature of from about 10° C. to about 60° C. and separating the brominated isoolefin-conjugated diolefin polymer, the amount of bromine being from about 0.30 to about 1.0 moles per mole of conjugated diolefin in said polymer, the improvement being that said solvent is a mixture comprising an inert saturated paraffinic hydrocarbon and an inert halogen-containing hydrocarbon in a volume ratio of from about 90/10 to about 10/90 of said paraffinic hydrocarbon to said halogen-containing hydrocarbon, wherein said halogen-containing hydrocarbon is a mono-, di- or tri-halogenated $C_1$ to $C_6$ paraffinic hydrocarbon or a halogenated aromatic hydrocarbon. Preferably, the halogen-containing hydrocarbon is selected from the group consisting of methyl chloride, methylene chloride, ethyl chloride, ethyl bromide, dichloroethane, n-butyl chloride and monochlorobenzene. See, also, U.S. Pat. Nos. 6,204,338, 6,262,409, EP 0 803 517 B1, and EP 0 803 518 B1.

However, finding new halogenation processes that would easily lend themselves to the use of HFCs and/or improve the efficiency of the halogenation process would be desirable.

SUMMARY OF THE INVENTION

In an embodiment, the invention provides for a process to halogenate a polymer, the process comprising contacting at least one polymer having $C_4$-$C_{10}$ isoolefin derived units, at least one halogen, and at least one hydrofluorocarbon in a solution to produce at least one halogenated polymer.

In yet another embodiment, the invention provides for a process to halogenate a polymer, the process comprising contacting at least one halogen and at least one polymer having $C_4$-$C_{10}$ isoolefin derived units produced from a slurry polymerization process utilizing one or more hydrofluorocarbons in a solution to produce at least one halogenated polymer.

In any of the previous embodiments, the solution may contain a non-functionalized hydrocarbon solvent.

DETAILED DESCRIPTION

Various specific embodiments, versions and examples of the invention will now be described, including preferred embodiments and definitions that are adopted herein for purposes of understanding the claimed invention. For determining infringement, the scope of the "invention" will refer to any one or more of the appended claims, including their equivalents, and elements or limitations that are equivalent to those that are recited.

As used herein, the new numbering scheme for the Periodic Table Groups are used as in CHEMICAL AND ENGINEERNG NEWS, 63(5), 27 (1985).

A reactor is any container(s) in which a chemical reaction occurs.

Slurry refers to the mixture of diluent comprising polymers that have precipitated from the diluent, unreacted monomers, and a catalyst system and/or catalyst system components. The slurry concentration is the weight percent of the partially or completely precipitated polymers based on the total weight of the slurry.

Solution refers to any mixture of at least one solvent and at least one polymer, wherein the solvent or a solvent mixture is able to dissolve the polymer to produce a single-phase homogenous mixture.

Polymer may be used to refer to homopolymers, copolymers, interpolymers, terpolymers, etc. Likewise, a copolymer may refer to a polymer comprising at least two monomers, optionally with other monomers.

When a polymer is referred to as comprising a monomer, the monomer is present in the polymer in the polymerized form of the monomer or in the derivative form of the monomer. Likewise, when catalyst components are described as comprising neutral stable forms of the components, it is well understood by one skilled in the art, that the ionic form of the component is the form that reacts with the monomers to produce polymers.

Isobutylene-based polymer refers to polymers comprising at least 80 mol % repeat units from isobutylene.

Isoolefin refers to any olefin monomer having two substitutions on the same carbon.

Multiolefin refers to any monomer having two or more double bonds. In a preferred embodiment, the multiolefin is any monomer comprising two conjugated double bonds such as isoprene.

Elastomer or elastomeric composition, as used herein, refers to any polymer or composition of polymers consistent with the ASTM D1566 definition. The terms may be used interchangeably with the term "rubber(s)", as used herein.

Alkyl refers to a paraffinic hydrocarbon group which may be derived from an alkane by dropping one or more hydrogens from the formula, such as, for example, a methyl group ($CH_3$), or an ethyl group ($CH_3CH_2$), etc.

Aryl refers to a hydrocarbon group that forms a ring structure characteristic of aromatic compounds such as, for example, benzene, naphthalene, phenanthrene, anthracene, etc., and typically possess alternate double bonding ("unsaturation") within its structure. An aryl group is thus a group derived from an aromatic compound by dropping one or more hydrogens from the formula such as, for example, phenyl, or $C_6H_5$.

Halogenation refers to reactions between at least one polymer containing at least one unsaturation unit contacted with at least one halogen to incorporate the at least one halogen into the polymer to form a halogenated polymer. The reactions typically proceed, for example, either in solution or in bulk. The halogenated polymer can contain various levels of incorporated halogen atoms on the polymer backbone depending on the degree of unsaturation of the starting polymer and the amount of halogen used. For example, the unsaturation unit may be a diene unit such as isoprene. Other polymers may be halogenated requiring some type of treatment, e.g., either chemical or process related, prior to halogenation such as polymers containing alkylstyrene units, such as para-methylstyrene. For example, these polymers may be halogenated using heat, light, and/or free radical initiators or sensitizers, such as organic peroxides or bis azo compounds, discussed in more detail below. Additionally, the at least one halogen may be, for example, bromine, chlorine, or both.

Halogen utilization refers to the relative amount of halogen incorporated into the polymer backbone and the amount of halogen used for the halogenation reaction. As is well understood in the art, the halogen utilization efficiency (usually expressed in percentage) can be effected by the degree of unsaturation of the starting polymer, the amount of halogen used for the reaction, and the reaction conditions such as temperature and residence time.

Polymers

Isobutylene-based polymers are widely used in industry as well as their methods of manufacture. Halogenated isobutylene base polymers are often the polymer of choice for applications where air impermeability is important. They are generally produced using continuous or batch cationic polymerization processes employing a high concentration of a $C_4$-$C_8$ isoolefin such as isobutylene in various types of reactors such as a plug flow reactor and/or stirred tank reactors.

In an embodiment, the isobutylene-based polymer made may be polymerized by contacting one or more monomer(s), one or more Lewis acids, and one or more initiators in a diluent comprising one or more hydrofluorocarbon(s) (HFCs) all discussed in more detail below and, for example, in WO 2004/058828 and WO 2004/058827.

Several of the more commercially significant isobutylene-based polymers such as "butyl rubbers" are available from ExxonMobil Chemical Company, Houston, Tex., and Lanxess Corporation, Pittsburgh, Pa.

Several monomers and combinations of monomers are provided below to illustrate the vast array of variations possible along with an equally diverse array of variations possible with the catalyst system that may be employed to produce such polymers.

Monomers

Exemplary monomers include one or more of olefins, alpha-olefins, disubstituted olefins, isoolefins, conjugated dienes, non-conjugated dienes, styrenics and/or substituted styrenics and vinyl ethers. The styrenic may be substituted (on the ring) with an alkyl, aryl, halide or alkoxide group. Preferably, the monomer contains 2 to 20 carbon atoms, more preferably 2 to 9, even more preferably 3 to 9 carbon atoms. Examples of preferred olefins include styrene, para-alkylstyrene, para-methylstyrene, alpha-methyl styrene, divinylbenzene, diisopropenylbenzene, isobutylene, 2-methyl-1-butene, 3-methyl-1-butene, 2-methyl-2-pentene, isoprene, butadiene, 2,3-dimethyl-1,3-butadiene, β-pinene, myrcene, 6,6-dimethyl-fulvene, hexadiene, cyclopentadiene, piperylene, methyl vinyl ether, ethyl vinyl ether, and isobutyl vinyl ether and the like. Monomer may also be combinations of two or more monomers. Styrenic block copolymers may also be used a monomers. Preferred block copolymers include copolymers of styrenics, such as styrene, para-methylstyrene, alpha-methylstyrene, and $C_4$ to $C_{30}$ diolefins, such as isoprene, butadiene, and the like. Particularly preferred monomer combinations include 1) isobutylene and para-methyl styrene 2) isobutylene and isoprene, as well as homopolymers of isobutylene.

Additionally, preferred monomers include those that are cationically polymerizable as described in *Cationic Polymerization of Olefins, A Critical Inventory*, Joseph Kennedy, Wiley Interscience, New York 1975. Monomers include any monomer that is cationically polymerizable, such as those monomers that are capable of stabilizing a cation or propagating center because the monomer contains an electron donating group. For a detailed discussion of cationic catalysis see *Cationic Polymerization of Olefins, A Critical Inventory*, Joseph Kennedy, Wiley Interscience, New York 1975.

The monomers may be present in the polymerization medium in an amount ranging from 75 wt % to 0.01 wt % in one embodiment, alternatively 60 wt % to 0.1 wt %, alternatively from 40 wt % to 0.2 wt %, alternatively 30 to 0.5 wt %, alternatively 20 wt % to 0.8 wt %, alternatively and from 15 wt % to 1 wt % in another embodiment.

Preferred polymers include homopolymers of any of the monomers listed in this Section. Examples of homopolymers include polyisobutylene, polypara-methylstyrene, polyisoprene, polystyrene, polyalpha-methylstyrene, polyvinyl ethers (such as polymethylvinylether, polyethylvinylether).

Preferred polymers also include copolymers of 1) isobutylene and an alkylstyrene such as methylstyrene, preferably para-methylstyrene; and 2) isobutylene and isoprene.

In one embodiment butyl polymers may be prepared by reacting a comonomer mixture, the mixture having at least (1) a $C_4$ to $C_6$ isoolefin monomer component such as isobutene with (2) a multiolefin, or conjugated diene monomer component. The isoolefin is in a range from 70 to 99.5 wt % by weight of the total comonomer mixture in one embodiment, 85 to 99.5 wt % in another embodiment. In yet another embodiment the isoolefin is in the range of 92 to 99.5 wt %. The conjugated diene component in one embodiment is present in the comonomer mixture from 30 to 0.5 wt % in one embodiment, and from 15 to 0.5 wt % in another embodiment. In yet another embodiment, from 8 to 0.5 wt % of the comonomer mixture is conjugated diene. The $C_4$ to $C_6$ isoolefin may be one or more of isobutene, 2-methyl-1-butene, 3-methyl-1-butene, 2-methyl-2-butene, and 4-methyl-1-pentene. The multiolefin may be a $C_4$ to $C_{14}$ conjugated diene such as isoprene, butadiene, 2,3-dimethyl-1,3-butadiene, β-pinene, myrcene, 6,6-dimethyl-fulvene, hexadiene, cyclopentadiene and piperylene. One embodiment of the butyl rubber polymer of the invention is obtained by reacting 85 to 99.5 wt % of isobutylene with 15 to 0.5 wt % isoprene, or by reacting 95 to 99.5 wt % isobutylene with 5.0 wt % to 0.5 wt % isoprene in yet another embodiment. The following table illustrates how the above-referenced wt % would be expressed as mol %.

| wt % IC4[a] | mol % IC4 | wt % IC5[b] | Mol % IC5 |
|---|---|---|---|
| 70 | 73.9 | .5 | .4 |
| 85 | 87.3 | 5 | 4.2 |
| 92 | 93.3 | 8 | 6.7 |
| 95 | 95.9 | 15 | 12.7 |
| 99.5 | 99.6 | 30 | 26.1 |

[a]IC4 - isobutylene
[b]IC5 - isoprene

This invention further relates to terpolymers and tetrapolymers comprising any combination of the monomers listed above. Preferred terpolymers and tetrapolymers include polymers comprising isobutylene, isoprene and divinylbenzene, polymers comprising isobutylene, para-alkylstyrene (preferably paramethyl styrene) and isoprene, polymers comprising cyclopentadiene, isobutylene, and paraalkyl styrene (preferably paramethyl styrene), polymers of isobutylene cyclopentadiene and isoprene, polymers comprising cyclopentadiene, isobutylene, and methyl cyclopentadiene, polymers comprising isobutylene, paramethylstyrene and cyclopentadiene.

Catalyst System

The catalyst system generally includes at least one Lewis Acid and at least one Initiator. The Lewis acid (also referred to as the co-initiator or catalyst) may be any Lewis acid based on metals from Group 4, 5, 13, 14 and 15 of the Periodic Table of the Elements, including boron, aluminum, gallium, indium, titanium, zirconium, tin, vanadium, arsenic, antimony, and bismuth. One skilled in the art will recognize that some elements are better suited in the practice of the invention. In one embodiment, the metals are aluminum, boron and titanium, with aluminum being desirable. Illustrative examples include $AlCl_3$, (alkyl)$AlCl_2$, $(C_2H_5)_2AlCl$ and $(C_2H_5)_3Al_2Cl_3$, $BF_3$, $SnCl_4$, $TiCl_4$.

Additionally, Lewis acids may be any of those useful in cationic polymerization of isobutylene copolymers including: aluminum trichloride, aluminum tribromide, ethylaluminum dichloride, ethylaluminum sesquichloride, diethylaluminum chloride, methylaluminum dichloride, methylaluminum sesquichloride, dimethylaluminum chloride, boron trifluoride, titanium tetrachloride, etc. with ethylaluminum dichloride and ethylaluminum sesquichloride being preferred.

Lewis acids such as methylaluminoxane (MAO) and specifically designed weakly coordinating Lewis acids such as $B(C_6F_5)_3$ are also suitable Lewis acids within the context of the invention.

As one skilled in the art will recognize the aforementioned listing of Lewis acids is not exhaustive and is provided for illustration. For a more information regarding Lewis acids in polymerization processes, see, for example, WO 2004/058828 and WO 2004/058827.

Initiators useful in this invention are those initiators which are capable of being complexed in a suitable diluent with the chosen Lewis acid to yield a complex which rapidly reacts with the olefin thereby forming a propagating polymer chain. Illustrative examples include Brönsted acids such as $H_2O$, HCl, RCOOH (wherein R is an alkyl group), and alkyl halides, such as $(CH_3)_3CCl$, $C_6H_5C(CH_3)_2Cl$ and (2-Chloro-2,4,4-trimethylpentane). More recently, transition metal complexes, such as metallocenes and other such materials that can act as single site catalyst systems, such as when activated with weakly coordinating Lewis acids or Lewis acid salts have been used to initiate isobutylene polymerization.

In an embodiment, the initiator comprises one or more of a hydrogen halide, a carboxylic acid, a carboxylic acid halide, a sulfonic acid, an alcohol, a phenol, a tertiary alkyl halide, a tertiary aralkyl halide, a tertiary alkyl ester, a tertiary aralkyl ester, a tertiary alkyl ether, a tertiary aralkyl ether, alkyl halide, aryl halide, alkylaryl halide, or arylalkylacid halide.

As one skilled in the art will recognize the aforementioned listing of initiator(s) is not exhaustive and is provided for illustration. For a more information regarding initiator(s) in polymerization processes, see, for example, WO 2004/058828 and WO 2004/058827.

Regardless of whether these polymers are obtained commercially such as in bale form, processed into smaller particles, and subsequently dissolved by a solvent, and then subjected to a halogenation process, or by an continuous process incorporating the polymerization process stage followed by a dissolving stage, and a halogenation stage, the halogenation process may proceed accordingly.

Halogenation

In an embodiment, a halogenation process proceeds as follows. The polymer is dissolved in an inert hydrocarbon solvent such as pentane, hexane, or heptane and the solution is fed to a halogenation reactor. The halogenation reactor is typically a vessel equipped with inlet and outlet lines and an agitator. A halogen such as bromine is also fed to the halogenation reactor at a controlled rate in relation to the amount of polymer and the double bond content of the polymer. The material from the reactor is treated with an aqueous alkaline solution, such as sodium hydroxide, to neutralize the hydrogen bromide formed in the halogenation reaction and to react with residual bromine and then contacted with hot water and steam to remove the solvent and produce a slurry of brominated polymer in water which is then handled in a conventional manner to yield the essentially dry halogenated polymer.

In some embodiments, the halogenation process can be facilitated by the use of a free radical initiator or radical initiator. A radical initiator may be any molecular fragment having one or more unpaired electrons, typically relatively short-lived and highly reactive. As is well understood, free radical initiation may occur through application of light (photochemically), heat (thermally), and/or a compound or sensitizer such as organic peroxide or bis azo compound. Common techniques are disclosed, for example, in U.S. Pat. No. 5,162,445. In an embodiment, random copolymers of isobutylene and para-methylstyrene as described herein may be halogenated through the use of the radical initiators.

Exemplary initiators are bis azo compounds such as azo bis isobutyronitrile, azo bis(2,4 dimethyl valero) nitrile, azo bis (2 methyl butyro) nitrile, and the like. Other radical initiators can also be used, but it is preferred to use a radical initiator which is relatively poor at hydrogen abstraction, so that it reacts preferentially with the halogen molecules such as bromine molecules to form, for example, bromine atoms rather than with the copolymer or solvent to form alkyl radicals.

Such compounds are commercially available, for example, as VAZO™ 52 initiator and VAZO™ 67 initiator.

In certain embodiments, the amount of radical initiator employed may vary between 0.02 and 1.00% by weight of the copolymer, alternatively, between about 0.02 and 0.30%.

Regardless of whether light, heat, and/or a radical initiator is employed, the halogenation process may proceed using a solvent or a mixed solvent comprising a non-functionalized hydrocarbon such as an inert saturated paraffinic hydrocarbon such as a non-functionalized hydrocarbon solvent and a halogen-containing hydrocarbon such as at least one hydrofluorocarbon.

For example, the hydrocarbon may be selected from $C_4$ to $C_{22}$ linear, cyclic, branched alkanes, alkenes, aromatics, and mixtures thereof. Other examples include butane, pentane, methylcyclopentane, isohexane, 2-methylpentane, 3-methylpentane, 2-methylbutane, 2,2-dimethylbutane, 2,3-dimethylbutane, 2-methylhexane, 3-methylhexane, 3-ethylpentane, 2,2-dimethylpentane, 2,3-dimethylpentane, 2,4-dimethylpentane, 3,3-dimethyl pentane, 2-methylheptane, 3-ethylhexane, 2,5-dimethylhexane, 2,2,4,-trimethylpentane, octane, heptane, butane, nonane, decane, dodecane, undecane, hexane, methyl cyclohexane, cyclopropane, cyclobutane, cyclopentane, methylcyclopentane, 1,1-dimethylcyclopentane, c is 1,2-dimethylcyclopentane, trans-1,2-dimethylcyclopentane, trans-1,3-dimethylcyclopentane, ethylcyclopentane, cyclohexane, methylcyclohexane, and mixtures thereof. Other examples of hydrocarbons include benzene, toluene, xylene, ortho-xylene, para-xylene, meta-xylene.

And yet other examples include but are not limited to butane, pentane, methylcyclopentane, isohexane, 2-methylpentane, 3-methylpentane, 2-methylbutane, 2,2-dimethylbutane, 2,3-dimethylbutane, 2-methylhexane, 3-methylhexane, 3-ethylpentane, 2,2-dimethylpentane, 2,3-dimethylpentane, 2,4-dimethylpentane, 3,3-dimethyl pentane, 2-methylheptane, 3-ethylhexane, 2,5-dimethylhexane, 2,24,-trimethylpentane, octane, heptane, butane, nonane, decane, dodecane, undecane, hexane, methyl cyclohexane, cyclopropane, cyclobutane, cyclopentane, methylcyclopentane, 1,1-dimethylcyclopentane, c is 1,2-dimethylcyclopentane, trans-1,2-dimethylcyclopentane, trans-1,3-dimethylcyclopentane, ethylcyclopentane, cyclohexane, methylcyclohexane, benzene, toluene, xylene, ortho-xylene, para-xylene, meta-xylene, and mixtures thereof.

In an embodiment, the hydrocarbon is hexane such as cyclohexane.

The halogen-containing hydrocarbon is at least one hydrofluorocarbon. Hydrofluorocarbons ("HFCs" or "HFC") are defined to be saturated or unsaturated compounds consisting essentially of hydrogen, carbon and fluorine, provided that at least one carbon, at least one hydrogen, and at least one fluorine are present.

In certain embodiments, the at least one hydrofluorocarbon is represented by the formula: $C_xH_yF_z$ wherein x is an integer from 1 to 40, alternatively from 1 to 30, alternatively from 1 to 20, alternatively from 1 to 10, alternatively from 1 to 6, alternatively from 2 to 20 alternatively from 3 to 10, alternatively from 3 to 6, most preferably from 1 to 3, wherein y and z are integers and at least one.

Illustrative examples include fluoromethane; difluoromethane; trifluoromethane; fluoroethane; 1,1-difluoroethane; 1,2-difluoroethane; 1,1,1-trifluoroethane; 1,1,2-trifluoroethane; 1,1,1,2-tetrafluoroethane; 1,1,2,2-tetrafluoroethane; 1,1,1,2,2-pentafluoroethane; 1-fluoropropane; 2-fluoropropane; 1,1-difluoropropane; 1,2-difluoropropane; 1,3-difluoropropane; 2,2-difluoropropane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3-tetrafluoropropane; 1,2,2,3-tetrafluoropropane; 1,1,1,2,2-pentafluoropropane; 1,1,1,2,3-pentafluoropropane; 1,1,1,3,3-pentafluoropropane; 1,1,2,2,3-pentafluoropropane; 1,1,2,3,3-pentafluoropropane; 1,1,1,2,2,3-hexafluoropropane; 1,1,1,2,3,3-hexafluoropropane; 1,1,1,3,3,3-hexafluoropropane; 1,1,1,2,2,3,3-heptafluoropropane; 1,1,1,2,3,3,3-heptafluoropropane; 1-fluoro-2-fluoropropane; 1,1-difluorobutane; 1,2-difluorobutane; 1,3-difluorobutane; 1,4-difluorobutane; 2,2-difluorobutane; 2,3-difluorobutane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,1,2,2-tetrafluorobutane; 1,1,2,3-tetrafluorobutane; 1,1,2,4-tetrafluorobutane; 1,1,3,3-tetrafluorobutane; 1,1,3,4-tetrafluorobutane; 1,1,4,4-tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3-pentafluorobutane; 1,1,1,3,4-pentafluorobutane; 1,1,1,4,4-pentafluorobutane; 1,1,2,2,3-pentafluorobutane; 1,1,2,2,4-pentafluorobutane; 1,1,2,3,3-pentafluorobutane; 1,1,2,4,4-pentafluorobutane; 1,1,3,3,4-pentafluorobutane; 1,2,2,3,3-pentafluorobutane; 1,2,2,3,4-pentafluorobutane; 1,1,1,2,2,3-hexafluorobutane; 1,1,1,2,2,4-hexafluorobutane; 1,1,1,2,3,3-hexafluorobutane, 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,1,2,2,3,3-hexafluorobutane; 1,1,2,2,3,4-hexafluorobutane; 1,1,2,2,4,4-hexafluorobutane; 1,1,2,3,3,4-hexafluorobutane; 1,1,2,3,4,4-hexafluorobutane; 1,2,2,3,3,4-hexafluorobutane; 1,1,1,2,2,3,3-heptafluorobutane; 1,1,1,2,2,4,4-heptafluorobutane; 1,1,1,2,2,3,4-heptafluorobutane; 1,1,1,2,3,3,4-heptafluorobutane; 1,1,1,2,3,4,4-heptafluorobutane; 1,1,1,2,4,4,4-heptafluorobutane; 1,1,1,3,3,4,4-heptafluorobutane; 1,1,1,2,2,3,3,4-octafluorobutane; 1,1,1,2,2,3,4,4-octafluorobutane; 1,1,1,2,3,3,4,4-octafluorobutane; 1,1,1,2,2,4,4,4-octafluorobutane; 1,1,1,2,3,4,4,4-octafluorobutane; 1,1,1,2,2,3,3,4,4-nonafluorobutane; 1,1,1,2,2,3,4,4,4-nonafluorobutane; 1-fluoro-2-methylpropane; 1,1-difluoro-2-methylpropane; 1,3-difluoro-2-methylpropane; 1,1,1-trifluoro-2-methylpropane; 1,1,3-trifluoro-2-methylpropane; 1,3-difluoro-2-(fluoromethyl)propane; 1,1,1,3-tetrafluoro-2-methylpropane; 1,1,3,3-tetrafluoro-2-methylpropane; 1,1,3-trifluoro-2-(fluoromethyl)propane; 1,1,1,3,3-pentafluoro-2-methylpropane; 1,1,3,3-tetrafluoro-2-(fluoromethyl)propane; 1,1,1,3-tetrafluoro-2-(fluoromethyl)propane; fluorocyclobutane; 1,1-difluorocyclobutane; 1,2-difluorocyclobutane; 1,3-difluorocyclobutane; 1,1,2-trifluorocyclobutane; 1,1,3-trifluorocyclobutane; 1,2,3-trifluorocyclobutane; 1,1,2,2-tetrafluorocyclobutane; 1,1,3,3-tetrafluorocyclobutane; 1,1,2,2,3-pentafluorocyclobutane; 1,1,2,3,3-pentafluorocyclobutane; 1,1,2,2,3,3-hexafluorocyclobutane; 1,1,2,2,3,4-hexafluorocyclobutane; 1,1,2,3,3,4-hexafluorocyclobutane; 1,1,2,2,3,3,4-heptafluorocyclobutane; and mixtures thereof and including mixtures of unsaturated HFC's described below. Particularly preferred HFC's include difluoromethane, trifluoromethane, 1,1-difluoroethane, 1,1,1-trifluoroethane, fluoromethane, and 1,1,1,2-tetrafluoroethane.

Illustrative examples of unsaturated hydrofluorocarbons include vinyl fluoride; 1,1-difluoroethane; 1,2-difluoroethane; 1,1,2-trifluoroethene; 1-fluoropropene, 1,1-difluoropropene; 1,2-difluoropropene; 1,3-difluoropropene; 2,3-difluoropropene; 3,3-difluoropropene; 1,1,2-trifluoropropene; 1,1,3-trifluoropropene; 1,2,3-trifluoropropene; 1,3,3-trifluoropropene; 2,3,3-trifluoropropene; 3,3,3-trifluoropropene; 1-fluoro-1-butene; 2-fluoro-1-butene; 3-fluoro-1-butene; 4-fluoro-1-butene; 1,1-difluoro-1-butene; 1,2-difluoro-1-butene; 1,3-difluoropropene; 1,4-difluoro-1-butene; 2,3-difluoro-1-butene; 2,4-difluoro-1-butene; 3,3-difluoro-1-butene; 3,4-difluoro-1-butene; 4,4-difluoro-1-butene; 1,1,2-trifluoro-1-butene; 1,1,3-trifluoro-1-butene; 1,1,4-trifluoro-1-butene; 1,2,3-trifluoro-1-butene; 1,2,4-trifluoro-1-butene; 1,3,3-trifluoro-1-butene; 1,3,4-trifluoro-1-butene; 1,4,4-trifluoro-1-butene; 2,3,3-trifluoro-1-butene; 2,3,4-trifluoro-1- butene; 2,4,4-trifluoro-1-butene; 3,3,4-trifluoro-1-butene; 3,4,4-trifluoro-1-butene; 4,4,4-trifluoro-1-butene; 1,1,2,3-tetrafluoro-1-butene; 1,1,2,4-tetrafluoro-1-butene; 1,1,3,3-tetrafluoro-1-butene; 1,1,3,4-tetrafluoro-1-butene; 1,1,4,4-tetrafluoro-1-butene; 1,2,3,3-tetrafluoro-1-butene; 1,2,3,4-tetrafluoro-1-butene; 1,2,4,4-tetrafluoro-1-butene; 1,3,3,4-tetrafluoro-1-butene; 1,3,4,4-tetrafluoro-1-butene; 1,4,4,4-tetrafluoro-1-butene; 2,3,3,4-tetrafluoro-1-butene; 2,3,4,4-tetrafluoro-1-butene; 2,4,4,4-tetrafluoro-1-butene; 3,3,4,4-tetrafluoro-1-butene; 3,4,4,4-tetrafluoro-1-butene; 1,1,2,3,3-pentafluoro-1-butene; 1,1,2,3,4-pentafluoro-1-butene; 1,1,2,4,4-pentafluoro-1-butene; 1,1,3,3,4-pentafluoro-1-butene; 1,1,3,4,4-pentafluoro-1-butene; 1,1,4,4,4-pentafluoro-1-butene; 1,2,3,3,4-pentafluoro-1-butene; 1,2,3,4,4-pentafluoro-1-butene; 1,2,4,4,4-pentafluoro-1-butene; 2,3,3,4,4-pentafluoro-1-butene; 2,3,4,4,4-pentafluoro-1-butene; 3,3,4,4,4-pentafluoro-1-butene; 1,1,2,3,3,4-hexafluoro-1-butene; 1,1,2,3,4,4-hexafluoro-1-butene; 1,1,2,4,4,4-hexafluoro-1-butene; 1,2,3,3,4,4-hexafluoro-1-butene; 1,2,3,4,4,4-hexafluoro-1-butene; 2,3,3,4,4,4-hexafluoro-1-butene; 1,1,2,3,3,4,4-heptafluoro-1-butene; 1,1,2,3,4,4,4-heptafluoro-1-butene; 1,1,3,3,4,4,4-heptafluoro-1-butene; 1,2,3,3,4,4,4-heptafluoro-1-butene; 1-fluoro-2-butene; 2-fluoro-2-butene; 1,1-difluoro-2-butene; 1,2-difluoro-2-butene; 1,3-difluoro-2-butene; 1,4-difluoro-2-butene; 2,3-difluoro-2-butene; 1,1,1-trifluoro-2-butene; 1,1,2-trifluoro-2-butene; 1,1,3-trifluoro-2-butene; 1,1,4-trifluoro-2-butene; 1,2,3-trifluoro-2-butene; 1,2,4-trifluoro-2-butene; 1,1,1,2-tetrafluoro-2-butene; 1,1,1,3-tetrafluoro-2-butene; 1,1,1,4-tetrafluoro-2-butene; 1,1,2,3-tetrafluoro-2-butene; 1,1,2,4-tetrafluoro-2-butene; 1,2,3,4-tetrafluoro-2-butene; 1,1,1,2,3-pentafluoro-2-butene; 1,1,1,2,4-pentafluoro-2-butene; 1,1,1,3,4-pentafluoro-2-butene; 1,1,1,4,4-pentafluoro-2-butene; 1,1,2,3,4-pentafluoro-2-butene; 1,1,2,4,4-pentafluoro-2-butene; 1,1,1,2,3,4-hexafluoro-2-butene; 1,1,1,2,4,4-hexafluoro-2-butene; 1,1,1,3,4,4-hexafluoro-2-butene; 1,1,1,4,4,4-hexafluoro-2-butene; 1,1,2,3,4,4-hexafluoro-2-butene; 1,1,1,2,3,4,4-heptafluoro-2-butene; 1,1,1,2,4,4,4-heptafluoro-2-butene; and mixtures thereof and including mixtures of saturated HFC's described above.

In another embodiment the HFC is selected from the group consisting of difluoromethane, trifluoromethane, 1,1-difluoroethane, 1,1,1-trifluoroethane, and 1,1,1,2-tetrafluoroethane, and mixtures thereof.

In certain embodiments, the at least one hydrofluorocarbon has a dielectric constant of greater than 10 at −85° C., preferably greater than 15, more preferably greater than 20, more preferably greater than 25, more preferably 40 or more. The dielectric constant $\in_D$ is determined from measurements of the capacitance of a parallel-plate capacitor immersed in a fluid [measured value $C_D$], in a reference fluid of known dielectric constant $\in_R$ [measured value $C_R$], and in air ($\in_A=1$) [measured value $C_A$]. In each case the measured capacitance $C_M$ is given by $C_M=\in C_C+C_S$, where $\in$ is the dielectric constant of the fluid in which the capacitor is immersed, $C_C$ is the cell capacitance, and $C_S$ is the stray capacitance. From these measurements $\in_D$ is given by the formula $\in_D=((C_D-C_A)\in_R+(C_R-C_D))/(C_R-C_A)$. Alternatively, a purpose-built instrument such as the Brookhaven Instrument Corporation BIC-870 may be used to measure dielectric constant of a fluid. A comparison of the dielectric constants ($\in$) of a few fluids at −85° C. is provided below.

| Fluid | $\in$ at −85° C. |
|---|---|
| Methyl chloride | 18.34 |
| Difluoromethane | 36.29 |
| 1,1-difluoroethane | 29.33 |
| 1,1,1-trifluoroethane | 22.18 |
| 1,1,1,2-tetrafluoroethane | 23.25 |
| 1,1,2,2-tetrafluoroethane | 11.27 |
| 1,1,1,2,2-pentafluoroethane | 11.83 |

In certain embodiments, the HFC is typically present at 1 to 50 volume % based upon the total volume of the solution, alternatively between 5 and 50 volume %, alternatively between 10 and 50 volume %, alternatively between 15 and 50 volume %, alternatively between 20 and 50 volume %, and alternatively between 25 and 50 volume %, These ranges may vary; however, as would be expected, the maximum amount of an HFC in a solution is limited by the solubility of polymer in the solution.

In yet other embodiments, the volume ratio of the hydrocarbon to hydrofluorocarbon is from about 90 parts to 10 parts to about 50 parts to 50 parts.

The solution in which the polymer is halogenated may also contain up to about 20, alternatively, from about 1 to about 15, volume percent of water based on the total solution.

Thus, in certain embodiments, using such a mixture as solvent for the polymer leads to an increase in the amount of halogen such as bromine which is incorporated into the polymer to form chemical structures that help facilitate the vulcanization of the polymer.

INDUSTRIAL APPLICATIONS

The invention described herein may be used to manufacture halogenated polymers useful in wide variety of applications. The low degree of permeability to gases accounts for the largest uses of these polymers, namely inner tubes and tire innerliners. These same properties are also of importance in air cushions, pneumatic springs, air bellows, accumulator bags, and pharmaceutical closures. The thermal stability of the polymers of the invention make them ideal for rubber tire-curing bladders, high temperature service hoses, and conveyor belts for hot material handling.

In certain embodiments, the halogenated polymers exhibit high damping and have uniquely broad damping and shock absorption ranges in both temperature and frequency. They are useful in molded rubber parts and find wide applications in automobile suspension bumpers, auto exhaust hangers, and body mounts.

In yet other embodiments, the halogenated polymers of the instant invention are useful in tire sidewalls and tread compounds. In sidewalls, the polymer characteristics impart good ozone resistance, crack cut growth, and appearance. The polymers of the invention may also be blended. Properly formulated blends with high diene rubbers that exhibit phase co-continuity yield excellent sidewalls. Improvements in wet, snow, and ice skid resistances and in dry traction without compromises in abrasion resistance and rolling resistance for high performance tires can be accomplished by using the polymers of the instant invention.

The halogenated polymers may also be used as adhesives, caulks, sealants, and glazing compounds. In certain applications, the halogenated polymers are useful in medical applications such as pharmaceutical stoppers, and the arts for paint rollers.

The following examples reflect embodiments of the invention and are by no means intended to be limiting of the scope of the invention.

EXAMPLES

Bromination of Polymer in a Hydrocarbon Solution

Bromination of a butyl polymer made in 1,1,1,2-tetrafluoroethane (R-134a) as well as the comparative butyl polymer made in methyl chloride (MeCl) was carried out using typical batch bromination technique. Prior to the bromination step, butyl polymer solution (cement) was prepared by dissolving desirable amount of butyl polymer sample in proper amount of cyclohexane (Aldrich, 99.9+, HPCL grade, lot #CA 00148CA) in a 500 ml round bottom flask. Bromine solutions were prepared by diluting liquid bromine (Aldrich Chemical Co., 99.5%, A.C.S. reagent grade, lot #10020 HR) with 3-5 times volume of cyclohexane in order to improve dispersion of bromine molecules in polymer solution.

Bromination reaction was carried out by adding the above bromine solution into the polymer solution with vigorous agitation. A standard 3-neck round bottom flask was utilized as the bromination reactor. Light exposure was carefully minimized during the bromination reaction in order to avoid/minimize the formation of bromine radicals. The bromine solution (based on the bromine target, the weight of polymer in the reactor, and the expected bromine utilization under the experimental conditions) was added slowly to the reactor using an addition funnel. The bromination reaction was allowed to continue for an additional minute. After the bromine addition was complete, the reaction mixture was quenched with 2 wt % aqueous solution of sodium hydroxide (Fisher certified, 99.9%, A.C.S. grade) in de-ionized water to form a quenched polymer solution. The quenched polymer solution was vigorously stirred for 15 to 20 minutes to make sure all residual bromine and bromination by-product (HBr) were completely neutralized. The neutralized polymer solution was allowed to settle until an aqueous bottom layer was clearly separated from top organic polymer solution.

The above brominated, neutralized polymer solution mixture was decanted into a large separatory funnel and washed with de-ionized water several times until the pH of the aqueous phase is neutral. The bottom aqueous layer was drained leaving the polymer solution behind. The polymer solution was transferred to a large beaker a 3-liter beaker and polymer was precipitated out of solution by slowly adding methanol (Fisher certified A.C.S. grade, 99.9%) to the polymer solution with continuous stirring. The precipitated polymer (99+% yield) was dried in a vacuum oven at 35° C. with nitrogen purge for several days before submitted for proton NMR analysis.

The mole % of Structure II (bromine incorporated at a secondary allylic position) and Structure III (bromine incorporated at a primary allylic position) isomers in the brominated polymers were determined by standard proton NMR analysis using a 500 MHz Varian Unity Plus NMR spectrometer in either $CDCl_3$ or toluene-$d_8$ at ambient temperature. The total mole % Br is the sum of Structure II and Structure III isomers and the total wt % Br were calculated from total mole % Br.

| Sample (starting backbone) | Isoprene Content of Starting Polymer (Mole %) | Polymer wt. (g) | Br2 added (g) | Structure II (m %) | Structure III (m %) | Total Br (m %) | Total Br (wt %) |
|---|---|---|---|---|---|---|---|
| A (Butyl from R-134a) | 1.54 | 67.37 | 2.06 | 0.146 | 0.912 | 1.06 | 1.51 |
| B (Butyl from R-134a) | 1.54 | 68.04 | 1.70 | 0.137 | 0.910 | 1.05 | 1.50 |
| C (Butyl from R-134a) | 1.54 | 69.94 | 2.14 | 0.156 | 0.895 | 1.05 | 1.50 |
| D (Butyl from MeCl) | 1.66 | 68.08 | 1.88 | 0.151 | 0.955 | 1.11 | 1.58 |
| E (Butyl from MeCl) | 1.66 | 62.70 | 2.01 | 0.144 | 0.956 | 1.10 | 1.57 |
| F (Butyl from MeCl) | 1.66 | 54.62 | 1.63 | 0.200 | 0.918 | 1.12 | 1.60 |
| G (Butyl 2255 backbone) | 0.96 | 15.00 | 1.50 | 0.177 | 0.996 | 1.173 | 1.68 |
| H (Butyl from R-134a) | 1.54 | 100.02 | 6.70 | 0.268 | 0.736 | 1.004 | 1.44 |
| I (Butyl from R-134a) | 1.54 | 100.01 | 6.71 | 0.346 | 0.674 | 1.020 | 1.46 |
| J (Butyl from MeCl) | 1.66 | 100.02 | 6.71 | 0.209 | 0.682 | 0.891 | 1.27 |
| K (Butyl from MeCl) | 1.66 | 100.00 | 6.70 | 0.220 | 0.659 | 0.879 | 1.26 |

The data indicated that the butyl polymer made in the presence R-134a showed similar performance or higher bromination utilization than the butyl polymer made in MeCl using similar bromination conditions. Additionally, either result represents an improvement over traditional polymers made in methyl chloride which were then halogenated because the inventive examples demonstrate the compatibility and feasibility of a continuous polymerization process including one or more HFCs followed by inventive halogenation processes.

Bromination of Polymer Using a Mixed Solvent

Bromination of butyl polymers was carried out using typical batch bromination technique. Prior to the bromination step, various amounts of 1,1,1,2-tetrafluoroethane (HFC R-134a DuPont, commercial grade, >98% purity) or 1,1,1,3,3,-pentafluoropropane (HFC 365, Honeywell, commercial grade, >98% purity), were added to Butyl 268 polymer (a commercial grade butyl rubber from ExxonMobil Chemical Company, Houston, Tex.) in hexane (ULB, technical grade) solution (cement) containing 6 wt % butyl polymer in a 500 ml round bottom flask. The addition of R-134a HFC to polymer cement was carried out by bubbling R-134a gas through the butyl polymer cement for 10 minutes to reach saturation at room temperature. HFC-365 was added to butyl polymer cement as liquid with agitation. Bromine solutions were prepared by diluting liquid bromine (Aldrich Chemical Co., 99.5%, A.C.S. reagent grade, lot #10020 HR) with 3-5 times volume of cyclohexane in order to improve dispersion of bromine molecules in polymer solution.

Bromination reaction was carried out by adding above bromine solution into the polymer solution with vigorous agitation. Light exposure was carefully minimized during bromination reaction in order to avoid/minimize the formation of bromine radicals. The bromine solution (based on the bromine target, the weight of polymer in the reactor and the expected bromine utilization under the experimental conditions) was added slowly to the reactor using an addition funnel. The bromination reaction was allowed to continue for additional minute after the bromine addition was complete and then the reaction mixture was quenched with 2 wt % aqueous solution of sodium hydroxide (Fisher certified, 99.9%, A.C.S. grade) in de-ionized water. The quenched polymer solution was vigorously stirred for 15 to 20 minutes to make sure all residual bromine and bromination by-product (HBr) were completely neutralized. The neutralized polymer solution was allowed to settle until an aqueous bottom layer was clearly separated from top organic polymer solution.

The above brominated, neutralized polymer solution mixture was decanted into a large separatory funnel and washed with de-ionized water several times until the pH of the aqueous phase is neutral. The bottom aqueous layer was drained leaving the polymer solution behind. The polymer solution was transferred to a large beaker and polymer was precipitated out of solution by slowly adding methanol (Fisher certified A.C.S. grade, 99.9%) to the polymer solution with continuous stirring. The precipitated polymer (99+% yield) was dried in a vacuum oven at 35° C. with nitrogen purge for several days before submitted for proton NMR analysis.

Proton NMR spectroscopic analyses were run in either CDCl$_3$ or toluene-d$_8$ at ambient temperature using a Varian Unity Plus NMR spectrometer with a field strength of 500 MHz. Bromine can be incorporated in the isoprene units in the polymer either as structure II (bromine incorporated at a secondary allylic position) or structure III (bromine incorporated at a primary allylic position). The mole % of structure II and structure III on polymer were determined by comparing the integration of the NMR signal of the structure II or structure III relative to the total NMR signal of isobutylene and isoprene in the backbone polymer. The total Br was the sum of structure II and structure III in the sample.

Relative bromination efficiency in the presence of HFC can be determined by the relative Bromine Utilization (B.U.) which was defined as the total bromine incorporated onto polymer as a percentage (%) of the total bromine added to the reactor under similar conditions. The theoretical maximum bromine utilization is 50% because only one Br atom from Br2 molecules can be added to polymer while the other Br atom was converted to HBr as the by-product of the bromination process. As would be expected by an artisan, due to the difficulty of handling very viscous polymer cement in the laboratory, the polymer concentration in the cement used in the examples was significantly lower than typical polymer content in the cement used in commercial bromination process. Consequently, without being bound to theory, it is believed that the bromine utilization in the examples was significantly lower than what would be in a commercial process. Nonetheless, the principle that the relative bromine utilization in the presence versus in the absence of HFC should have universal application regardless of scale and the data demonstrates of the positive impact of HFC addition on bromine utilization.

| Sample | Polymer wt (g) | Br2 added (g) | Structure II (m %) | Structure III (m %) | Total Br (m %) | Total Br (wt %) | B.U. (%) |
|---|---|---|---|---|---|---|---|
| Butyl Cement w/o HFC | 50.1 | 2.86 | 0.751 | 0.137 | 0.888 | 1.27 | 22.2 |
| Butyl Cement + R-134a | 50.0 | 2.86 | 0.791 | 0.180 | 0.971 | 1.39 | 24.3 |
| Butyl Cement w/1 vol % HFC-365 | 50.0 | 2.86 | 0.830 | 0.116 | 0.946 | 1.35 | 23.7 |
| Butyl Cement w/5 vol % HFC-365 | 50.0 | 2.87 | 0.819 | 0.178 | 0.997 | 1.43 | 24.8 |
| Butyl Cement w/10 vol % HFC-365 | 50.0 | 2.87 | 0.758 | 0.302 | 1.06 | 1.52 | 26.4 |
| Butyl Cement w/15 vol % HFC-365 | 50.0 | 2.87 | 0.941 | 0.212 | 1.153 | 1.65 | 28.7 |

In particular, the data demonstrated that the addition of HFC in butyl polymer cement improved bromination utilization or bromine incorporation into the polymers. The first two rows data in Table 1 showed that saturating polymer hexane cement with R-134a at ambient temperature increased the bromine incorporation on polymer by about 9%, i.e., from 0.888 m % to 0.971 m % under similar reaction conditions. The following four rows data clearly showed that adding increasing amount of HFC-365 in polymer hexane cement increased the bromine incorporation on polymer under similar bromination conditions. A 15 v % addition of HFC-365 to polymer cement, the bromine incorporation on polymer increased by almost 30%, i.e., from 0.888 mole % Br to 1.153 mole % Br. Without being bound to theory, it is believed that the data indicated that the degree of bromine utilization improvement increases with increasing amount of HFC addition to polymer hexane cement. It further believed that the maximum amount of HFC that can be added to butyl polymer cement depends on the boiling point of the HFC and the compatibility of HFC with the polymer cement. For example, when HFC's with low boiling point such as R-134a (b.p.=−48° C.) was used, only very limited HFC concentration can be expected in polymer cement at ambient temperature. However, when an HFC with higher boiling point, such as HFC-365, was used, a significantly higher level of HFC-365 can be added to polymer cement at ambient temperature. It is believed that the maximum effective level of HFC can be added to butyl polymer cement will be limited by the compatibility of the HFC with polymer hexane cement. Beyond the maximum acceptable HFC level, the polymer will start to precipitate out of solution. For HFC-365, the maximum acceptable level that can be added to polymer cement without polymer precipitation was determined to be about 15 v % and the bromine incorporation increased steadily with increasing amount of HFC addition to the polymer cement. Such an increase represents a significant improvement because this not only reduces the raw material cost, but also reduces the amount of undesirable by-product produced from the bromination process.

All patents and patent applications, test procedures (such as ASTM methods), and other documents cited herein are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

What is claimed is:

1. A process to halogenate a polymer, the process comprising contacting a random copolymer comprising isoolefin and methylstyrene derived units, at least one halogen, and at least one hydrofluorocarbon in a solution to produce at least one halogenated polymer, wherein the at least one hydrofluorocarbon is represented by the formula: $C_xH_yF_z$ wherein x is an integer from 1 to 40 and y and z are integers of one or more.

2. The process of claim 1, wherein the at least one halogenated polymer exhibits greater halogen utilization than a polymer halogenated in the presence of a chlorinated hydrocarbon under similar conditions.

3. The process of claim 2, wherein the chlorinated hydrocarbon is methyl chloride.

4. The process of claim 2, wherein the at least one halogen is bromine or chlorine.

5. The process of claim 1, wherein the solution further comprises a radical initiator or is exposed to heat or light.

6. The process of claim 5, wherein the radical initiator is an organic peroxide or a bis azo compound.

7. The process of claim 1, wherein the at least one halogenated polymer comprises about 1.4 or greater wt % halogen based upon the total weight of the at least one halogenated polymer.

8. The process of claim 1, wherein x is from 1 to 6.

9. The process of claim 1, wherein the at least one hydrofluorocarbon is independently selected from the group consisting of fluoromethane; difluoromethane; trifluoromethane; fluoroethane; 1,1-difluoroethane; 1,2-difluoroethane; 1,1,1-trifluoroethane; 1,1,2-trifluoroethane; 1,1,1,2-tetrafluoroethane; 1,1,2,2-tetrafluoro ethane; 1,1,1,2,2-pentafluoroethane; 1-fluoropropane; 2-fluoropropane; 1,1-difluoropropane; 1,2-difluoropropane; 1,3-difluoropropane; 2,2-difluoropropane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3-tetrafluoropropane; 1,2,2,3-tetrafluoropropane; 1,1,1,2,2-pentafluoropropane; 1,1,1,2,3-pentafluoropropane; 1,1,1,3,3-pentafluoropropane; 1,1,2,2,3-pentafluoropropane; 1,1,2,3,3-pentafluoropropane; 1,1,1,2,2,3-hexafluoropropane; 1,1,1,2,3,3-hexafluoropropane; 1,1,1,3,3,3-hexafluoropropane; 1,1,1,2,2,3,3-heptafluoropropane; 1,1,1,2,3,3,3-heptafluoropropane; 1-fluorobutane; 2-fluorobutane; 1,1-difluorobutane; 1,2-difluorobutane; 1,3-difluorobutane; 1,4-difluorobutane; 2,2-difluorobutane; 2,3-difluorobutane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,1,2,2-tetrafluorobutane; 1,1,2,3-tetrafluorobutane; 1,1,2,4-tetrafluorobutane; 1,1,3,3-tetrafluorobutane; 1,1,3,4-tetrafluorobutane; 1,1,4,4-tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3-pentafluorobutane; 1,1,1,3,4-pentafluorobutane; 1,1,1,4,4-pentafluorobutane; 1,1,2,2,3-pentafluorobutane; 1,1,2,2,4-pentafluorobutane; 1,1,2,3,3-pentafluorobutane; 1,1,2,4,4-pentafluorobutane; 1,1,3,3,4-pentafluorobutane; 1,2,2,3,3-pentafluorobutane; 1,2,2,3,4-pentafluorobutane; 1,1,1,2,2,3-hexafluorobutane; 1,1,1,2,2,4-hexafluorobutane; 1,1,1,2,3,3-hexafluorobutane, 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,1,2,2,3,3-hexafluorobutane; 1,1,2,2,3,4-hexafluorobutane; 1,1,2,2,4,4-hexafluorobutane; 1,1,2,3,3,4-hexafluorobutane; 1,1,2,3,4,4-hexafluorobutane; 1,2,2,3,3,4-hexafluorobutane; 1,1,1,2,2,3,3-heptafluorobutane; 1,1,1,2,2,4,4-heptafluorobutane; 1,1,1,2,2,3,4-heptafluorobutane; 1,1,1,2,3,3,4-heptafluorobutane; 1,1,1,2,3,4,4-heptafluorobutane; 1,1,1,2,4,4,4-heptafluorobutane; 1,1,1,3,3,4,4-heptafluorobutane; 1,1,2,2,3,3,4-octafluorobutane; 1,1,1,2,2,3,4,4-octafluorobutane; 1,1,1,2,3,3,4,4-octafluorobutane; 1,1,1,2,2,4,4,4-octafluorobutane; 1,1,1,2,3,4,4,4-octafluorobutane; 1,1,1,2,2,3,3,4-nonafluorobutane; 1,1,1,2,2,3,4,4-nonafluorobutane; 1-fluoro-2-methylpropane; 1,1-difluoro-2-methylpropane; 1,3-difluoro-2-methylpropane; 1,1,1-trifluoro-2-methylpropane; 1,1,3-trifluoro-2-methylpropane; 1,3-difluoro-2-(fluoromethyl)propane; 1,1,1,3-tetrafluoro-2-methylpropane; 1,1,3,3-tetrafluoro-2-methylpropane; 1,1,3-trifluoro-2-(fluoromethyl)propane; 1,1,1,3,3-pentafluoro-2-methylpropane; 1,1,3,3-tetrafluoro-2-(fluoromethyl)propane; 1,1,1,3-tetrafluoro-2-(fluoromethyl)propane; fluorocyclobutane; 1,1-difluorocyclobutane; 1,2-difluorocyclobutane; 1,3-difluorocyclobutane; 1,1,2-trifluorocyclobutane; 1,1,3-trifluorocyclobutane; 1,2,3-trifluorocyclobutane; 1,1,2,2-tetrafluorocyclobutane; 1,1,3,3-tetrafluorocyclobutane; 1,1,2,2,3-pentafluorocyclobutane; 1,1,2,3,3-pentafluorocyclobutane; 1,1,2,2,3,3-hexafluorocyclobutane; 1,1,2,2,3,4-hexafluorocyclobutane; 1,1,2,3,3,4-hexafluorocyclobutane; 1,1,2,2,3,3,4-heptafluorocyclobutane; vinyl fluoride; 1,1-difluoroethene; 1,2-difluoroethene; 1,1,2-trifluoroethene; 1-fluoropropene, 1,1-difluoropropene; 1,2-difluoropropene; 1,3-difluoropropene; 2,3-difluoropropene; 3,3-difluoropropene; 1,1,2-trifluoropropene; 1,1,3-trifluoropropene; 1,2,3-trifluoropropene; 1,3,3-trifluoropropene; 2,3,3-trifluoropropene; 3,3,3-trifluoropropene; 1-fluoro-1-butene; 2-fluoro-1-butene; 3-fluoro-1-butene; 4-fluoro-1-butene; 1,1-difluoro-1-butene; 1,2-difluoro-1-butene; 1,3-difluoropropene; 1,4-difluoro-1-butene; 2,3-difluoro-1-butene; 2,4-difluoro-1-butene; 3,3-difluoro-1-butene; 3,4-difluoro-1-butene; 4,4-difluoro-1-butene; 1,1,2-trifluoro-1-butene; 1,1,3-trifluoro-1-butene; 1,1,4-trifluoro-1-butene; 1,2,3-trifluoro-1-butene; 1,2,4-trifluoro-1-butene; 1,3,3-trifluoro-1-butene; 1,3,4-trifluoro-1-butene; 1,4,4-trifluoro-1-butene; 2,3,3-trifluoro-1-butene; 2,3,4-trifluoro-1-butene; 2,4,4-trifluoro-1-butene; 3,3,4-trifluoro-1-butene; 3,4,4-trifluoro-1-butene; 4,4,4-trifluoro-1-butene; 1,1,2,3-tetrafluoro-1-butene; 1,1,2,4-tetrafluoro-1-butene; 1,1,3,3-tetrafluoro-1-butene; 1,1,3,4-tetrafluoro-1-butene; 1,1,4,4-tetrafluoro-1-butene; 1,2,3,3-tetrafluoro-1-butene; 1,2,3,4-tetrafluoro-1-butene; 1,2,4,4-tetrafluoro-1-butene; 1,3,3,4-tetrafluoro-1-butene; 1,3,4,4-tetrafluoro-1- butene; 1,4,4,4-tetrafluoro-1-butene; 2,3,3,4-tetrafluoro-1-butene; 2,3,4,4-tetrafluoro-1-butene; 2,4,4,4-tetrafluoro-1-butene; 3,3,4,4-tetrafluoro-1-butene; 3,4,4,4-tetrafluoro-1-butene; 1,1,2,3,3-pentafluoro-1-butene; 1,1,2,3,4-pentafluoro-1-butene; 1,1,2,4,4-pentafluoro-1-butene; 1,1,3,3,4-pentafluoro-1-butene; 1,1,3,4,4-pentafluoro-1-butene; 1,1,4,4,4-pentafluoro-1-butene; 1,2,3,3,4-pentafluoro-1-butene; 1,2,3,4,4-pentafluoro-1-butene; 1,2,4,4,4-pentafluoro-1-butene; 2,3,3,4,4-pentafluoro-1-butene; 2,3,4,4,4-pentafluoro-1-butene; 3,3,4,4,4-pentafluoro-1-butene; 1,1,2,3,3,4-hexafluoro-1-butene; 1,1,2,3,4,4-hexafluoro-1-butene; 1,1,2,4,4,4-hexafluoro-1-butene; 1,2,3,3,4,4-hexafluoro-1-butene; 1,2,3,4,4,4-hexafluoro-1-butene; 2,3,3,4,4,4-hexafluoro-1-butene; 1,1,2,3,3,4,4-heptafluoro-1-butene; 1,1,2,3,4,4,4-heptafluoro-1-butene; 1,1,3,3,4,4,4-heptafluoro-1-butene; 1,2,3,3,4,4,4-heptafluoro-1-butene; 1-fluoro-2-butene; 2-fluoro-2-butene; 1,1-difluoro-2-butene; 1,2-difluoro-2-butene; 1,3-difluoro-2-butene; 1,4-difluoro-2-butene; 2,3-difluoro-2-butene; 1,1,1-trifluoro-2-butene; 1,1,2-trifluoro-2-butene; 1,1,3-trifluoro-2-butene; 1,1,4-trifluoro-2-butene; 1,2,3-trifluoro-2-butene; 1,2,4-trifluoro-2-butene; 1,1,1,2-tetrafluoro-2-butene; 1,1,1,3-tetrafluoro-2-butene; 1,1,1,4-tetrafluoro-2-butene; 1,1,2,3-tetrafluoro-2-butene; 1,1,2,4-tetrafluoro-2-butene; 1,2,3,4-tetrafluoro-2-butene; 1,1,1,2,3-pentafluoro-2-butene; 1,1,1,2,4-pentafluoro-2-butene; 1,1,1,3,4-pentafluoro-2-butene; 1,1,1,4,4-pentafluoro-2-butene; 1,1,2,3,4-pentafluoro-2-butene; 1,1,2,4,4-pentafluoro-2-butene; 1,1,1,2,3,4-hexafluoro-2-butene; 1,1,1,2,4,4-hexafluoro-2-butene; 1,1,1,3,4,4-hexafluoro-2-butene; 1,1,1,4,4,4-hexafluoro-2-butene; 1,1,2,3,4,4-hexafluoro-2-butene; 1,1,1,2,3,4,4-heptafluoro-2-butene; 1,1,1,2,4,4,4-heptafluoro-2-butene; and mixtures thereof.

10. The process of claim 1, wherein the solution comprises from about 1 to about 70 volume % of the at least one hydrofluorocarbon based upon the total volume of the solution.

11. The process of claim 1, wherein the solution comprises at least one non-halogenated hydrocarbon solvent.

12. The process of claim 1, wherein the at least one hydrofluorocarbon has a dielectric constant ($\in$) of at least 19.00 at −85° C. or greater.

13. The process of claim 1, wherein the at least one polymer is produced from a slurry polymerization process.

14. A process to produce a halogenated polymer, the process comprising:
1) a slurry polymerization process stage, the slurry polymerization process stage utilizing a diluent comprising at least one hydrofluorocarbon, to produce at least one polymer having $C_4$-$C_{10}$ isoolefin derived units, the slurry polymerization process stage being in fluid communication with
2) a halogenation process stage, the halogenation process stage comprising contacting the at least one polymer, at least one halogen, and at least one hydrofluorocarbon in a solution to produce the at least one halogenated polymer.

15. The process of claim 14, wherein the at least one polymer is either a copolymer of isobutylene and a multiolefin or is a random copolymer of an isoolefin and methylstyrene.

16. The process of claim 14, wherein the at least one halogenated polymer exhibits greater halogen utilization than a polymer halogenated in the presence of a chlorinated hydrocarbon under similar conditions.

17. The process of claim 16, wherein the at least one halogen is bromine or chlorine.

18. The process of claim 14, wherein the solution further comprises a radical initiator or is exposed to heat or light.

19. The process of claim 18, wherein the radical initiator is an organic peroxide or a bis azo compound.

20. The process of claim 14, wherein the at least one halogenated polymer comprises about 1.4 or greater wt % halogen based upon the total weight of the at least one halogenated polymer.

21. The process of claim 14, wherein the at least one hydrofluorocarbon is represented by the formula: $C_xH_yF_z$ wherein x is an integer from 1 to 6 and y and z are integers of one or more.

22. The process of claim 14, wherein the solution comprises from about 1 to about 70 volume % of the at least one hydrofluorocarbon based upon the total volume of the solution.

23. The process of claim 14, wherein the solution comprises at least one non-halogenated hydrocarbon solvent.

* * * * *